United States Patent [19]

Garrett

[11] Patent Number: 4,976,109
[45] Date of Patent: Dec. 11, 1990

[54] REFRIGERATED CONTAINERS

[75] Inventor: Michael E. Garrett, Woking, England

[73] Assignee: The BOC Group, Inc., Murray Hill, N.J.

[21] Appl. No.: 404,301

[22] Filed: Sep. 7, 1989

[30] Foreign Application Priority Data

Sep. 9, 1988 [GB] United Kingdom ............... 8821231

[51] Int. Cl.$^5$ ............................................. F25J 3/08
[52] U.S. Cl. ........................................ 62/18; 62/78; 62/94
[58] Field of Search ................... 62/17, 18, 78, 94

[56] References Cited

U.S. PATENT DOCUMENTS

| | | | |
|---|---|---|---|
| 3,102,777 | 9/1963 | Bedrosian et al. | 62/78 |
| 3,830,078 | 8/1974 | Read | 62/78 |
| 4,689,062 | 8/1987 | MacLean et al. | 62/18 |
| 4,716,739 | 1/1988 | Harris et al. | 62/78 |
| 4,740,378 | 4/1988 | Jameson | 62/78 |
| 4,754,611 | 7/1988 | Hosaka et al. | 62/78 |
| 4,817,391 | 4/1989 | Roe et al. | 62/78 |
| 4,829,774 | 5/1989 | Wassibauer et al. | 62/78 |

FOREIGN PATENT DOCUMENTS 3424755 5/1985 Fed. Rep. of Germany.
2021841 7/1970 France.

Primary Examiner—Ronald C. Capossela
Attorney, Agent, or Firm—Robert I. Pearlman; Carol A. Nemetz; David M. Rosenblum

[57] ABSTRACT

A refrigerated container 2 has associated therewith a compressor 6 which receives filtered air and passes it to a small apparatus 12 for separating air by pressure swing adsorption or by different rates of permeation of gas through semi-permeable membranes. Resulting air depleted in oxygen and water vapor flows into the interior of the container 2 and displaces atmosphere from the container 2 through a vent tube 20. Reducing the oxygen and water vapor content of the atmosphere in the container 2 (which may be a refrigerator or freezer) helps to preserve food stored therein and reduces the deposition of water or ice.

7 Claims, 1 Drawing Sheet

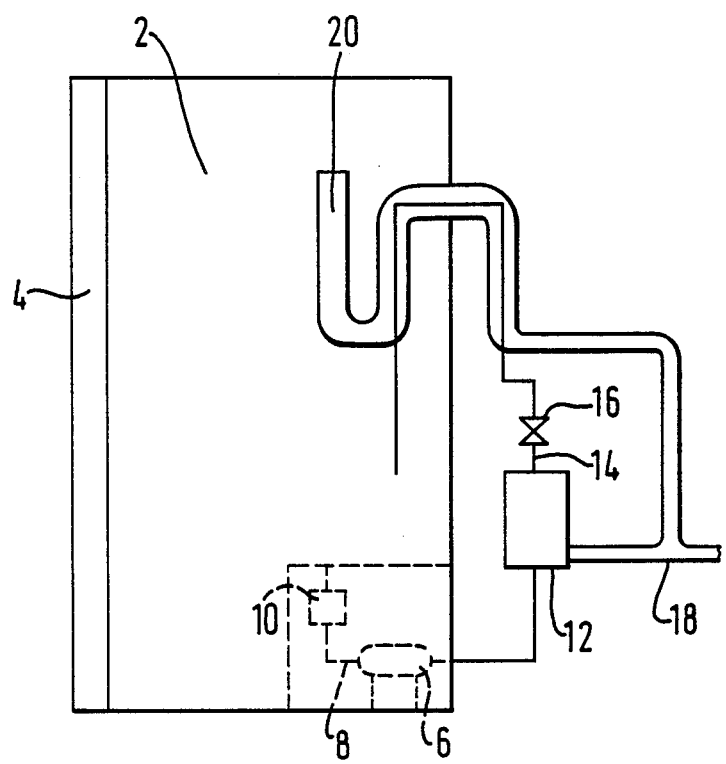

REFRIGERATED CONTAINERS

TECHNICAL FIELD

This invention relates to refrigerated containers and to a method of maintaining therein an atmosphere having a reduced oxygen and water vapour content.

BACKGROUND OF THE PRIOR ART

Food stored in domestic or commercial refrigerators or freezers tends to deteriorate as a result of the oxygen content of the atmosphere. Moreover, there is a tendency for moisture to build up in a freezer leading to undesirable deposits of ice and inefficient operation of the freezer. Excessive moisture is also undesirable in refrigerators.

UK patent specification No. 1 525 710 relates to the use of carbon dioxide supplied from a cylinder to limit the build up of ice in a refrigerated open-topped freezer cabinet. The carbon dioxide is introduced into the freezer cabinet at a region adjacent a heat-exchange surface so as to form a pocket of carbon dioxide in the aforesaid region and blanket that region from atmospheric moisture. Such a method suffers from the disadvantage that it requires the cylinder to be replaced at regular intervals. Moreover, the mere blanketing of a region of the cabinet does not prevent or hinder the ingress of water vapour through the open-top of the freezer cabinet. In order to achieve this end, it would be necessary to have a net flow of carbon dioxide out of the top of the cabinet which would be undesirable. Furthermore, there is no suggestion in UK Pat. No. 1 525 710 that there is any need to reduce the water vapour and oxygen content of the atmosphere inside a closed refrigerator or freezer cabinet.

SUMMARY OF THE INVENTION

According to the present invention there is provided an apparatus comprising a refrigerated container having associated therewith an air compressor having an outlet communicating with a port in a gas separation vessel containing adsorbent or membranes able to separate oxygen and water vapour from the air, the vessel having an outlet port for air depleted in oxygen and water vapour communicating with the interior of the container, and the container being provided with a vent tube.

The invention also provides a method of maintaining an atmosphere of reduced water vapour and oxygen content in the interior of a refrigerated container comprising the steps of compressing air, separating water vapour and oxygen from the air by means of adsorbent or membranes, passing the air depleted in oxygen and water vapour into the container and thereby displacing atmosphere from the container through a vent tube.

The adsorbent in the vessel may include carbon molecular sieve adapted to adsorb oxygen and water vapour more rapidly than nitrogen. In addition, there may be a lower layer of desiccant such as alumina which adsorbs water vapour from the air. Typically, the adsorbent or adsorbents in the vessel are periodically regenerated by opening a vent port which places the container in communication with the atmosphere. The vessel thus operates on a so-called "pressure swing adsorption" cycle adsorbing gas at high pressure and desorbing it at atmospheric pressure. There may be two such vessels enabling one to be regenerated while the other is separating the incoming air, or just a single vessel. It is preferred that the outlet port for the oxygen and moisture depleted air communicates with a reservoir so as to enable the water vapour and oxygen depleted air to be supplied continuously to the refrigerated container even in periods during which the vessel or vessels are being regenerated or are being equalised in pressure with one another. Pressure swing adsorption apparatus whether having a single vessel or two vessels is well known and is commercially available. Suitable pressure swing adsorption apparatus for use in the invention is for example described in UK patent application No. 2 195 097A.

An alternative to employing pressure swing adsorption to separate the air is to use membranes. There are well known membranes which are able to effect a separation as between on the one hand oxygen and water vapour and on the other hand nitrogen by virtue of the greater permeability of the former fluids. As is well known, the membranes may be made for example in the form of tubes and the air supplied around the outside of the tubes with the vent gases being withdrawn from the inside of the tubes.

Preferably, the vessel, whether it separates air by pressure swing adsorption or by use of membranes, has a vent pipe through which the waste gases (which are enriched in water vapour and oxygen) are vented to the atmosphere. The vent tube of the refrigerated cabinet preferably communicate with the vent pipe. Accordingly, the oxygen concentration in the gases vented from the vessel is reduced by being diluted by nitrogen-enriched atmosphere from the refrigerated cabinet. Another preferred feature of apparatus according to the invention is for the conduit leading from the vessel into the refrigerated container to extend for at least a part of this length inside the vent tube from the refrigerated container whereby the incoming nitrogen is cooled by heat exchange with vented atmosphere from the refrigerated container.

The rate at which the air depleted in water vapour and oxygen is supplied to the refrigerated container is typically less than 0.2 cubic meters per hour depending on the volume of the container.

BRIEF DESCRIPTION OF THE DRAWING

The method and apparatus according to the invention are now described by way of example with reference to the accompanying single drawing of FIG. 1 which is a schematic side elevation of a refrigerated container according to the invention.

DETAILED DESCRIPTION OF THE INVENTION

Referring to the drawing, there is shown a refrigerated container 2 having a door 4. The refrigerated container 2 may be a domestic or commerical refrigerator or freezer. Since the invention does not concern the provision of the necessary low temperature for refrigerating the interior of the cabinet, these parts of the apparatus 2 are not shown in the drawing.

The container 2 has a compressor 6 associated therewith having an inlet 8 communicating with the ambient atmosphere outside the container 2 via an air filter 10. The outlet of the compressor 6 communicates with a small apparatus 12 for separating air by pressure swing adsorption or by selective permeation through semipermeable membranes. The apparatus 12 may be as hereinbefore described. It has an outlet pipe 14 with a back pressure regulating valve or an orifice 16 disposed therein to control the gas flow to the container 2. In addition, the apparatus 12 has a vent gas outlet pipe 18.

The outlet conduit 14 terminates within the interior of the container 2. The container 2 is provided with a vent tube 20 which at one end communicated with the interior of the container at a region distant from the outlet of the conduit 14 and at its other end terminates in the vent pipe 18 from the apparatus 12. For part of this length, the conduit 14 extends concentrically within the tube 20.

In operation, the compressor 6 draws in filtered air and compresses it to an elevated pressure which may for example be between 2 and 8 atmospheres absolute. The compressed air is then passed to the apparatus 12 in which its water vapour and oxygen concentration are reduced. The resulting air depleted in oxygen and water vapour then passes into the interior of the container 2 through the conduit 14. As the gas flows along a conduit 14 it is cooled by heat exchange with atmosphere being vented from the interior of the container 2. To facilitate such heat exchange the conduit 14 is preferably formed of suitable heat conductive metals such as copper. On entering the interior of container 2 the air depleted in oxygen and water vapour displaces atmosphere from the container 2 through the vent tube 20. Since this atmosphere is at the prevailing sub-ambient temperature in the container 2 that part of it displaced therefrom through the vent tube 20 is able to provide cooling to the incoming air depleted in oxygen and water vapour. Moreover, it becomes mixed with oxygen-enriched air discharged from the apparatus 12 through the vent pipe 18 so as to restore the oxygen content of that gas to approximately that of the atmosphere.

The apparatus according to the invention is thus able to be used to maintain a nitrogen-enriched and water vapour-depleted atmosphere within container 2. Nitrogen-enrichment helps to retard deterioration of perishable foodstuffs stored in the container 2. Moreover, by maintaining an atmosphere with a low concentration of water vapour in the container 2 at the rate at which moisture or ice is deposited on surfaces in the container 2 is reduced.

I claim:

1. An apparatus comprising: a refrigerated container; an air compressor having an inlet in communication with ambient atmosphere and an outlet for discharging compressed air; gas separation vessel means for separating oxygen and water vapour from the air; the gas separation vessel means having an inlet port in communication with the outlet of the compressor and an outlet port for discharging air depleted in oxygen and water vapour communicating with the interior of the container; and the container having a vent tube communicating with the interior of the container for venting atmosphere within the container displaced by the depleted air.

2. The apparatus as claimed in claim 1, in which the gas separation vessel means also has a vent pipe for discharging waste gas comprising the oxygen and water vapour removed from the air, and the vent tube communicates with the vent pipe to restore the oxygen content of the atmosphere vented from the container.

3. The apparatus as claimed in claim 2, in which the said outlet port communicates with the interior of the container via a conduit which extends for a part of its length through the vent tube to cool the air depleted in oxygen and water vapour entering the container.

4. A method of maintaining an atmosphere of reduced water vapour and oxygen content in the interior of a refrigerated container comprising the steps of: compressing the air; passing the compressed air into gas separation means for separating water vapour and oxygen from the air and thereby producing a depleted air stream depleted in water vapour and oxygen and a waste air stream comprising water vapour and oxygen; and passing depleted air stream into the container and thereby displacing atmosphere from the container through a vent tube communicating with the interior of the container.

5. The method as claimed in claim 4, in which the air separation means separate water vapour and oxygen from the air by pressure swing absorption.

6. The method as claimed in claim 5, in which the displaced atmosphere is mixed with the waste gas stream to restore the oxygen content of the displaced atmosphere.

7. The method as claimed in claim 4, in which the depleted air stream is heat exchanged upstream of the container with the displaced atmosphere flowing through the vent tube to cool the depleted air stream.

* * * * *

UNITED STATES PATENT AND TRADEMARK OFFICE
CERTIFICATE OF CORRECTION

PATENT NO. : 4,976,109
DATED : December 11, 1990
INVENTOR(S) : Michael E. Garrett It is certified that error appears in the above-indentified patent and that said Letters Patent is hereby corrected as shown below:

Col. 4, line 31, after the word "passing" insert --the--.

line 37, delete the word "absorption" and substitute

--adsorption--.

Signed and Sealed this

Fifth Day of October, 1993

Attest:

BRUCE LEHMAN

*Attesting Officer*    Commissioner of Patents and Trademarks